United States Patent
Yamamoto

(10) Patent No.: US 10,634,979 B2
(45) Date of Patent: Apr. 28, 2020

(54) LIGHTING APPARATUS CHANGING ASPECT RATIO OF SCREEN AND PROJECTION TYPE IMAGE DISPLAY APPARATUS PROVIDED WITH THE LIGHTING APPARATUS

(71) Applicant: Panasonic Intellectual Property Management Co., Ltd., Osaka (JP)

(72) Inventor: Norikazu Yamamoto, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/256,401

(22) Filed: Jan. 24, 2019

(65) Prior Publication Data
US 2019/0235372 A1    Aug. 1, 2019

(30) Foreign Application Priority Data
Jan. 31, 2018   (JP) .................................. 2018-014647

(51) Int. Cl.
*G03B 21/20*    (2006.01)
*G02B 27/30*    (2006.01)
(Continued)

(52) U.S. Cl.
CPC ..... *G03B 21/2013* (2013.01); *G02B 27/0955* (2013.01); *G02B 27/0972* (2013.01);
(Continued)

(58) Field of Classification Search
CPC .... G03B 21/28; G03B 21/142; G03B 21/208; G03B 21/2013; G03B 21/2033;
(Continued)

(56) References Cited

U.S. PATENT DOCUMENTS

2006/0126690 A1   6/2006  Kido et al.
2008/0247022 A1   10/2008 Yamauchi et al.
(Continued)

FOREIGN PATENT DOCUMENTS

JP   2006-171348   6/2006
JP   2008-256824   10/2008
(Continued)

*Primary Examiner* — Sultan Chowdhury
(74) *Attorney, Agent, or Firm* — Wenderoth, Lind & Ponack, L.L.P.

(57) ABSTRACT

A lighting apparatus is provided with a light source unit including laser diode elements, a collimating lens, and at least one optical element changing only a predetermined one-axis direction of a traveling direction of the substantially parallel light. When the substantially parallel light is incident on a first surface of the optical element, the optical element reflects the substantially parallel light by a second surface to change only the one-axis direction of the traveling direction of the substantially parallel light, and emits an inclined light flux inclined from the substantially parallel light. An aspect ratio of a screen configured by spot lights from the light source unit is changed to an aspect ratio on a cross section of a predetermined position in a traveling direction of the inclined light flux.

7 Claims, 13 Drawing Sheets

(51) Int. Cl.
*G02B 27/09* (2006.01)
*G03B 21/14* (2006.01)

(52) U.S. Cl.
CPC ............ *G02B 27/30* (2013.01); *G03B 21/142* (2013.01); *G03B 21/2033* (2013.01)

(58) Field of Classification Search
CPC ................................................ G03B 21/2053; G03B 21/2066; G02B 27/10; G02B 27/30; G02B 27/095; G02B 27/149; G02B 27/0955; G02B 27/0972; G02B 27/0994; H04N 9/3111; H04N 9/3126; H04N 9/3161; H04N 9/3164; H04N 9/3188
See application file for complete search history.

(56) References Cited

U.S. PATENT DOCUMENTS

| | | | |
|---|---|---|---|
| 2012/0155079 A1 | 6/2012 | Miura | |
| 2014/0211170 A1* | 7/2014 | Kitano | G03B 21/204 353/31 |
| 2016/0223887 A1* | 8/2016 | Egawa | G02B 27/48 |
| 2018/0031959 A1* | 2/2018 | Yasumatsu | H04N 9/3152 |
| 2018/0074392 A1 | 3/2018 | Akiyama et al. | |

FOREIGN PATENT DOCUMENTS

| | | |
|---|---|---|
| JP | 2012-128214 | 7/2012 |
| JP | 2016-186585 | 10/2016 |
| JP | 2016-186909 | 10/2016 |

* cited by examiner

LIGHTING APPARATUS CHANGING ASPECT RATIO OF SCREEN AND PROJECTION TYPE IMAGE DISPLAY APPARATUS PROVIDED WITH THE LIGHTING APPARATUS

BACKGROUND OF THE DISCLOSURE

1. Field of the Disclosure

The present disclosure relates to a lighting apparatus using a plurality of laser diodes as illumination light sources, and a projection type image display apparatus using the same lighting apparatus.

2. Description of Related Art

In recent years, instead of a conventional discharge lamp using mercury, development of a technique using a laser diode has been promoted for an illumination light source for a lighting apparatus and a projection type image apparatus.

Since laser diode light can be shaped into nearly parallel light by a collimating lens disposed on a front surface of a laser diode, the laser diode collects light more efficiently than the conventional discharge lamp. However, it cannot be said at present that an individual light output power is sufficiently high. Therefore, in order to increase the light output power of the lighting apparatus and the projection type image display apparatus, a light source unit in which pluralities of laser diodes and collimating lenses are disposed is configured to increase the light output power.

A reduced optical system is disposed at the subsequent stage of the light source unit, and reducing light beam flux of substantially parallel light emitted from the light source unit leads to forming of a spot light. Then, for example, it is possible to excite a phosphor, and to collect the light on the rod end face of the optical integrator.

Generally speaking, the light source unit has such a configuration that a plurality of individual laser diodes is regularly arranged, and it is difficult to closely arrange the laser diodes due to the physical size restrictions of the package of the laser diode and the collimating lens disposed on the front surface. As a result, the light beam flux of the light source unit has been a light beam flux with clearances.

Additionally, there have been cases where a horizontal to vertical ratio of arrangement of light source unit portions (corresponding to an aspect ratio of a screen, which is configured by a plurality of spot lights) does not become a desirable size due to thinner devices and product restrictions on arrangement of the light source units such as light quantity balance. At that time, the arrangement of the lens system of the subsequent reduced optical system is restricted by the large aspect ratio, leading to increase in size thereof, and this results in an increase in size of the device.

Additionally, when the light source unit is used in a projection type image display apparatus, in a case where the light beam flux is reduced in the subsequent reduced optical system in the state of the aspect ratio being large, an angle of a light beam at an edge is determined by an image height incident on the lens at the time of collecting light on an optical integrator. Thus, when horizontal to vertical ratios of light beams emitted from the lighting apparatus differ from each other among colors, vertical and horizontal angles of respective light beams incident on or emitted from the optical integrator, namely, the F-numbers, of respective light beams differ from each other. As a result, when all the lights are to be used as projection light, the size of the optical system increases.

On the contrary, when the F-number of the optical system is set to be a small value so as to restrict the light beams having different vertical and horizontal light beam angles, namely, different F-numbers for size reduced, the light beams are blocked in the middle of the optical system. Therefore, a ratio of projection light decreases and a light output reaching the screen decreases. In addition, the vertical and horizontal F-numbers for respective colors are different from each other. Accordingly, for example, when the projection lens is zoomed, the F-number fluctuates during zooming of the projection lens, so that the color projected on the screen also changes. This leads to a difficulty to obtain a stable light output.

In order to solve this problem, there is needed a configuration for correcting the entire optical system, such as tapering of a rod in the optical integrator and correcting vertical and horizontal light beam angles by using the cylindrical lens.

In Patent Document 1, a light source apparatus is configured such that a plurality of optical elements having reflective surfaces different in direction is arranged in front of a light source unit, and a part of a light beam flux emitted from the light source unit is reflected and then reflected again among arrangement pitches of laser diodes in the same axial direction in the light source unit. Then the light beam flux from the light source unit is reduced in one direction.

Further, in Patent Document 2, a light source apparatus is configured such that a plurality of optical elements having reflective surfaces different in direction is arranged in columns of all optical axes other than a central axis, and further, the length of the optical element is changed for each column. Then the light beam flux outputted from the light source unit is reduced in one direction irrespective of arrangement intervals of laser diodes.

PRIOR ART DOCUMENTS

Patent Documents

Patent Document 1: Japanese Patent Laid-open Publication No. JP2016-186585A; and Patent Document 2: Japanese Patent Laid-open Publication No. JP2016-186909A.

However, in the technique described in Patent Document 1, it is configured to reflect the light into arrangement pitches between the laser diodes in the light source unit by using a plurality of optical elements. There has thus been such a problem that the interval to be reduced is restricted by the arrangement interval between the laser diodes, and then, further optical correction is required for the arrangement at an optimum aspect ratio.

In addition, the technique described in Patent Document 2, it is configured such that the arrangement pitch between the laser diodes in the light source unit is not restricted by the arrangement interval between the laser diodes by using a plurality of optical elements having different lengths so as to overcome the problem of Patent Document 1. However, respective columns require optical elements having different sizes from each other, thus causing a problem of complication of a holding mechanism in addition to an increase in the number of optical components.

Additionally, in the techniques described in Patent Document 1 and Patent Document 2, the reflective surfaces of two optical elements are configured such that light beams incident on the optical elements and light beams emitted therefrom are in the same direction. As a result, there has been such a problem that the arrangement is restricted so as to make a light beam perpendicular to the surface of the light source unit.

SUMMARY OF THE DISCLOSURE

An object of the present disclosure is to solve the above problems, and to provide a lighting apparatus and a projection type image display apparatus, capable of freely changing an aspect ratio without any restriction by an arrangement interval between laser diodes, without increase in the number of optical components and without complications of a holding mechanism.

According to one aspect of the present disclosure, there is provided a lighting apparatus including a light source unit, a collimating lens, and at least one optical element. The light source unit includes a plurality of laser diode elements arranged in two dimensions. The collimating lens is disposed in front of the light source unit, and the collimating lens converts a light flux emitted from each of the laser diodes into substantially parallel light. The at least one optical element is disposed in front of the collimating lens, and the optical element changes only a predetermined one-axis direction of a traveling direction of the substantially parallel light. The optical element has optical transparency, and has a first surface perpendicular to the substantially parallel light and a second surface inclined from the first surface. When the substantially parallel light is incident on the first surface of the optical element, the optical element reflects the substantially parallel light by the second surface to change only the one-axis direction of the traveling direction of the substantially parallel light, and emits an inclined light flux inclined from the substantially parallel light. An aspect ratio of a screen configured by a plurality of spot lights from the light source unit is changed to a predetermined aspect ratio on a cross section of a predetermined position in a traveling direction of the inclined light flux.

Therefore, according to the lighting apparatus of the present disclosure, it is possible to provide the lighting apparatus and the like, which are capable of freely changing an aspect ratio without any restriction by an arrangement interval between laser diodes, without increase in the number of optical components and without complications of a holding mechanism.

EMBODIMENTS

Embodiments will be described in detail below with reference to the drawings as appropriate. However, detailed descriptions may be omitted more than necessary. For example, detailed description of already well-known matters and redundant description on substantially the same configuration may be omitted. This is to avoid the unnecessary redundancy of the following description and to facilitate understanding by those skilled in the art.

It is noted that the accompanying drawings and the following description are provided to enable those skilled in the art to fully understand the present disclosure, and are not intended to limit the claimed subject matter.

First Embodiment

Hereinafter, a first embodiment will be described with reference to FIGS. 1 to 5. Hereinafter, as a specific embodiment of a projection type image display apparatus according to the present disclosure, a projection type image display apparatus having a digital micromirror device (hereinafter, referred to as DMD) that performs optical deflection control will be described.

[1-1. Configuration]

Figure 1:
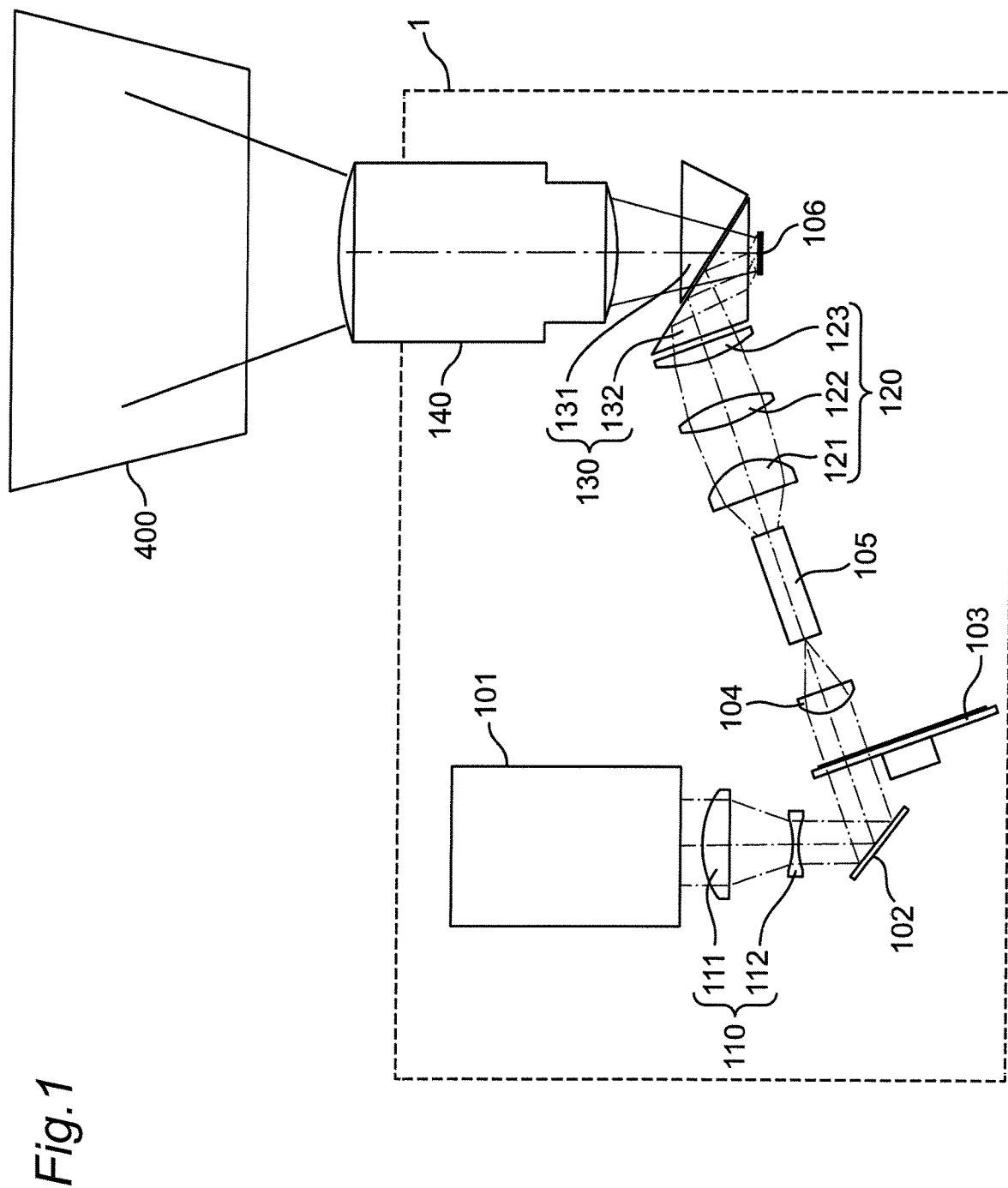
FIG. 1 is a schematic plan view showing a configuration example of a projection type image display apparatus 1 according to a first embodiment.

FIG. 1 is a schematic plan view showing a configuration example of a projection type image display apparatus 1 according to the first embodiment.

Referring to FIG. 1, the projection type image display apparatus 1 is configured to include a lighting apparatus 101, an afocal optical system 110, a reflective mirror 102, a diffusion plate wheel 103, a collecting optical system 104, a rod integrator 105, a relay optical system 120, an internal total reflection prism (hereinafter, referred to as a TIR prism) 130, a light deflection controller 106, and a projection optical system 140. In this case, the afocal optical system 110 is configured to include, for example, a single-convex lens 111, and a biconcave lens 112. The relay optical system 120 is configured to include, for example, single-convex lenses 121 and 123 and a biconvex lens 122. The TIR prism 130 is configured to include, for example, prisms 131, 132.

A light flux of laser light, which is parallel light outputted from the lighting apparatus 101, is reflected by the reflective mirror 102 via the afocal optical system 110, and then passes through the diffusion plate wheel 103. The passing laser light is reduced in its coherence by the diffusion plate wheel 103, and then collected by the collecting optical system 104. The collected laser light is incident on the rod integrator 105 of reduced optical system, and then is converted into light having a uniform light quantity distribution. The converted light is guided to the light deflection controller 106 via the relay optical system 120 and the TIR prism 130. The light is deflected in accordance with an optical modulation signal by the DMD of the light deflection controller 106, to generate image light. The generated image light is projected onto a screen 400 via the projection optical system 140, and an image corresponding to the image light is displayed on the screen 400.

[1-1-1. Configuration of Lighting Apparatus]

Figure 2:
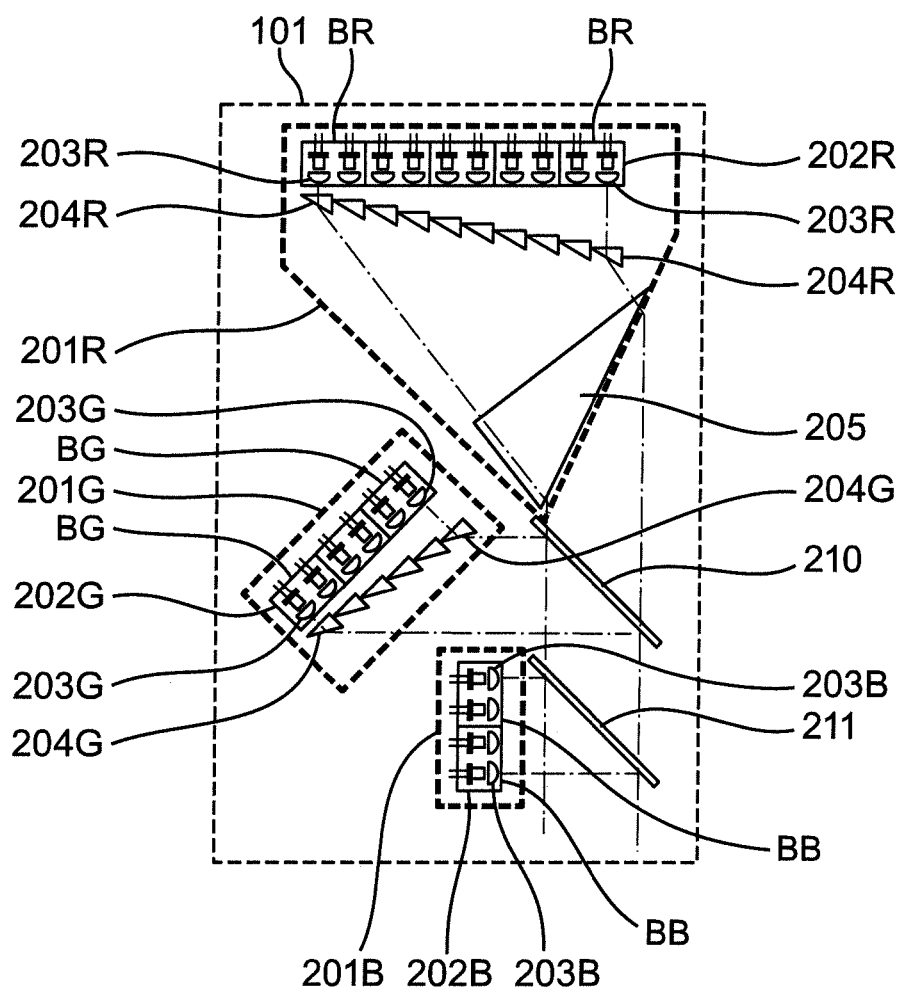
FIG. 2 is a schematic plan view showing an internal configuration example of a lighting apparatus 101 of FIG. 1.

FIG. 2 is a schematic plan view showing an internal configuration example of the lighting apparatus 101 of FIG. 1.

Referring to FIG. 2, the lighting apparatus 101 is configured to include three-colored light source parts 201B, 201G and 201R and color synthesis mirrors 210 and 211.

The red light source part 201R is configured to include a red light source unit 202R having a plurality of red light sources, a plurality of collimating lenses 203R provided corresponding to the respective red light sources, a plurality of optical elements 204R, and a triangular prism 205. The green light source part 201G is configured to include a green light source unit 202G having a plurality of green light sources, a plurality of collimating lenses 203G provided corresponding to the respective green light sources, and a plurality of optical elements 204G. The blue light source unit 201B is configured to include a blue light source unit 202B having a plurality of blue light sources, and a plurality of collimating lenses 203B provided corresponding to the respective blue light sources. It is noted that the optical elements 204G and 204R of the respective colors are configured by, for example, triangular prisms.

The light source units 202B, 202G and 202R are light sources of blue, green, and red, respectively. The light source units 202B, 202G and 202R are configured using two to five each of light source blocks BB, BG and BR formed by grouping laser diodes with different emission colors in 4×2 arrangement in two dimensions in the vertical and horizontal directions. The reason why the number of light source units differs for respective emission colors is to balance the light output and luminosity of each color. In the configuration example of FIG. 2, the blue light source unit 202B is configured by two light source blocks BB, the green light source unit 202G is configured by three light source blocks BG, and the red light source unit 202R is configured by five light source blocks BR. As a result, horizontal to vertical ratios (corresponding to an aspect ratio of a screen configured by a plurality of spot lights from the light source, and hereinafter, referred to as an aspect ratio) of the light source units 202B, 202G and 202R of the respective colors are different from each other as follows.

(1) The blue light source unit 202B is configured by the light source blocks BB in 4×4 arrangement and has an aspect ratio of 1:1.

(2) The green light source unit 202G is configured by the light source blocks BG in 4×6 arrangement and has an aspect ratio of 2:3.

(3) The red light source unit 202R is configured by the light source blocks BR in 4×10 arrangement and has an aspect ratio of 2:5.

Figure 3A:
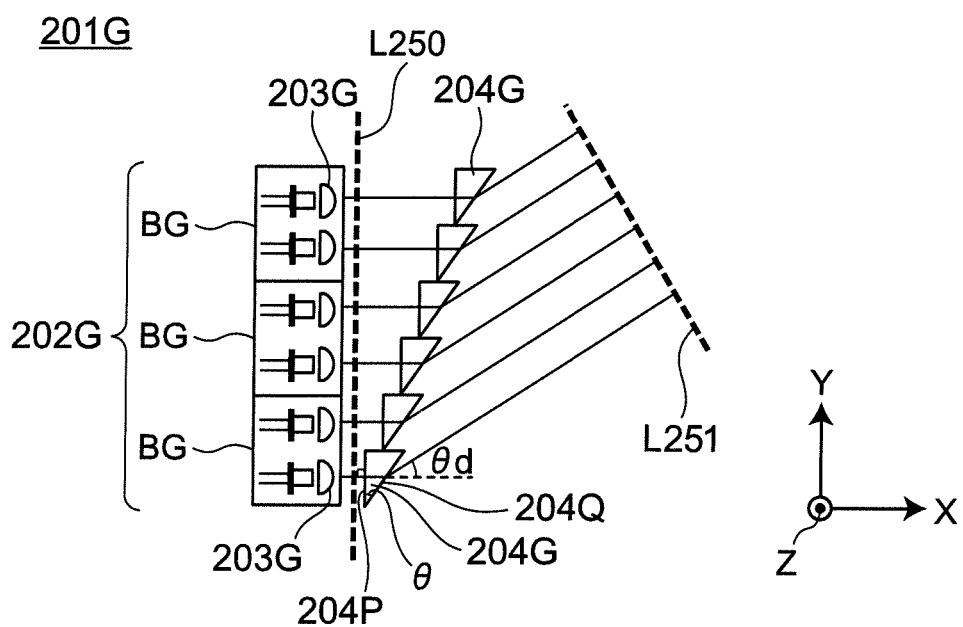
FIG. 3A is a schematic plan view showing a configuration example and optical paths of a green light source part 201G of FIG. 2.
Figure 3B:
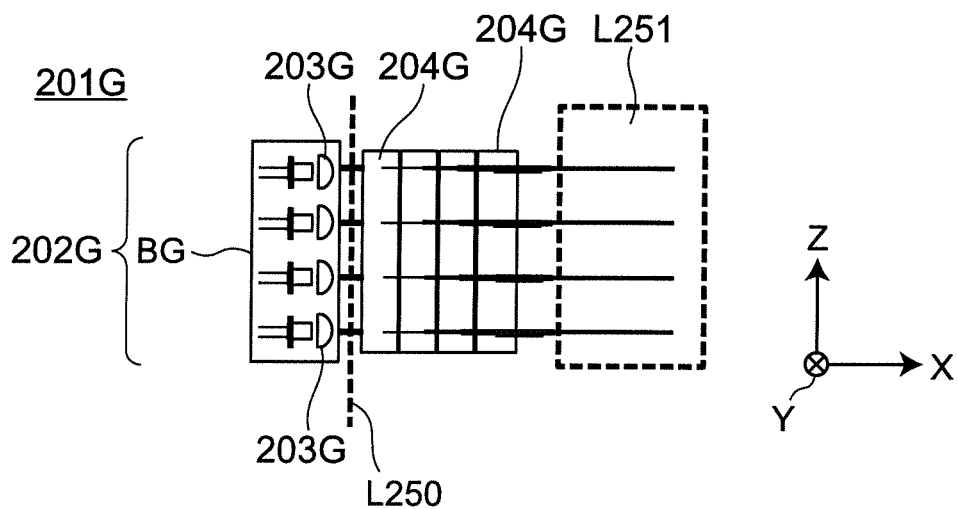
FIG. 3B is a schematic side view showing the configuration example and the optical paths of the green light source part 201G of FIG. 2.
Figure 3C:
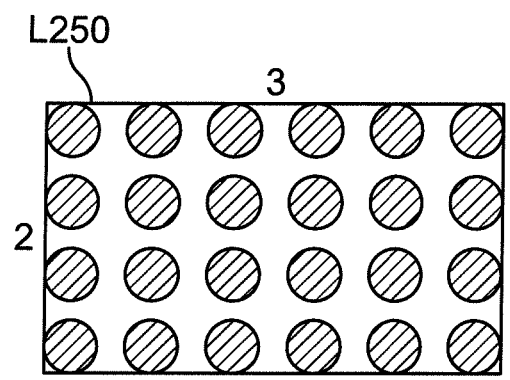
FIG. 3C is a front view showing a screen configured by a plurality of spot lights on a cross section L250 of FIGS. 3A and 3B.
Figure 3D:
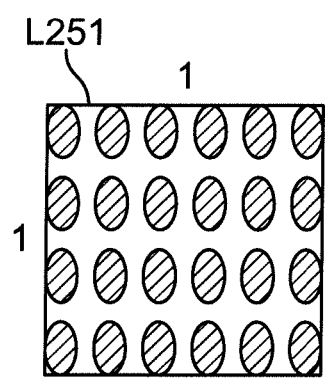
FIG. 3D is a front view showing a screen configured by a plurality of spot lights on a cross section L251 of FIGS. 3A and 3B.

FIG. 3A is a schematic plan view showing a configuration example and optical paths of the green light source part 201G of FIG. 2, and FIG. 3B is a schematic side view showing the configuration example and the optical paths of the green light source part 201G of FIG. 2. FIG. 3C is a front view showing a screen configured by a plurality of spot lights on a cross section L250 of FIGS. 3A and 3B, and FIG. 3D is a view showing the screen configured by the plurality of spot lights on a cross section L251 of FIGS. 3A and 3B. In FIG. 3A, the direction in which the laser light is emitted is defined as an X-axis direction, the direction perpendicular to the X-axis direction on a plane of FIG. 3A is defined as a Y-axis direction, and the direction perpendicular to the XY-plane is defined as a Z-axis direction.

Referring to FIGS. 3A and 3B, the light outputted from each light source of the green light source unit 202G is shaped into substantially parallel light substantially parallel to the X-axis direction by the collimating lens 203G, and is then incident on each of the plurality of optical elements 204G. In this case, each optical element 204G is an optical element having optical transparency and configured by an incident plane 204P perpendicular to the substantially parallel light, and an emitting plane 204Q inclined at a predetermined inclination angle θ from an incident plane 204P (namely, inclined at an angle θ from incident substantially plane light). The inclination angle θ of the emitting plane 204Q is set such that the incident light is not totally reflected in the optical element 204G. For example, the material for the optical element 204G used in the present configuration example is made of borosilicate glass (BK7), the inclination angle θ is 37 degrees, and the refraction angle θd of the incident substantially plane light is about 29 degrees.

The light emitted from the collimating lens 203G is incident via the incident plane 204P of the optical element 204G, and is refracted by an angle θd from the inclined emitting plane 204Q. Then only a one-axis direction of the traveling direction of the light of the green light source unit 202G is changed, for example, on the XY-plane. The light is then emitted from the emitting plane 204Q of the optical element 204G, and is inclined, for example, by about 29 degrees from the light beam (X-axis direction) emitted from the collimating lens 203G via the optical element 204G. By individually arranging each of the plurality of optical elements 204G with a distance shifted from the traveling direction (X-axis direction) of the substantially parallel light from the collimating lens 203G as shown in FIG. 3A, the optical element 204G can change a compression ratio of a light flux emitted from the optical element 204G. In the configuration example of FIG. 3A, the positions of the plurality of optical elements 204G are adjusted in the X-axis direction, such that the aspect ratio of the screen configured by the plurality of spot lights from the blue light source part 201B is 1:1 on the cross section L251, and that phases of the plurality of light beams emitted from the respective collimating lenses 203G are the same on the cross section L251. In an implementation example using the configuration example of FIG. 3A, since an interval between the plurality of light sources of the light source part 201G is 11 mm, the adjacent optical elements 204G are arranged as shifted by about 4.7 mm in the X-axis direction.

As a result, as shown in FIG. 3C, the aspect ratio of the screen configured by a plurality of spot lights from the green light source unit 202G is 2:3 on the cross section L250 after emission from the respective collimating lenses 203G. In contrast, on the cross section L251 after passing through the plurality of optical elements 204G, as shown in FIG. 3D, the screen configured by a plurality of spot lights is shaped so that the aspect ratio is 1:1 in a manner similar to the aspect ratio of the blue light source unit 202B. The aspect ratio can be changed to a freely selected aspect ratio by changing the inclination angle θ (the angle from the X-axis direction) and/or the interval among respective optical elements 204G. Although the spot light emitted from each of the collimating lenses 203G is actually elliptical light, the spot light is shown as circular light so as to facilitate understanding of the state in which its shape changes at the time of shaping.

In a manner similar to the green light source unit 202G, the red light source unit 202R also performs aspect conversion using a plurality of optical elements 204R. This will be described below.

Figure 4A:
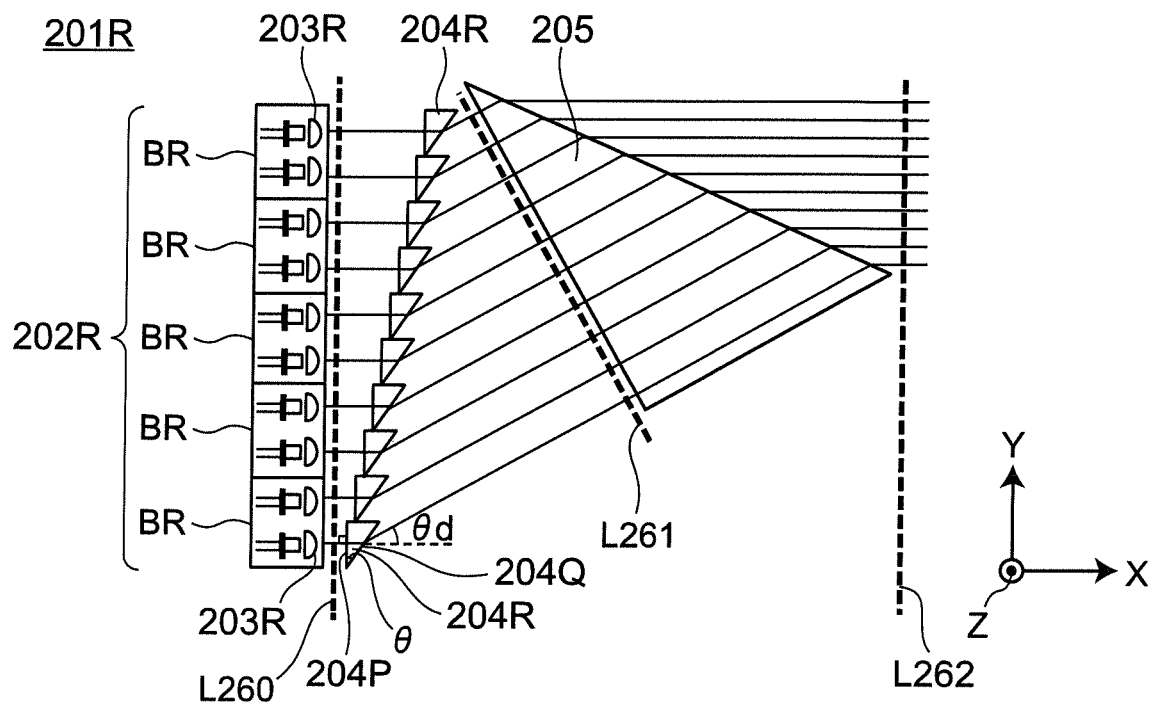
FIG. 4A is a schematic plan view showing a configuration example and optical paths of a red light source part 201R of FIG. 2.
Figure 4B:
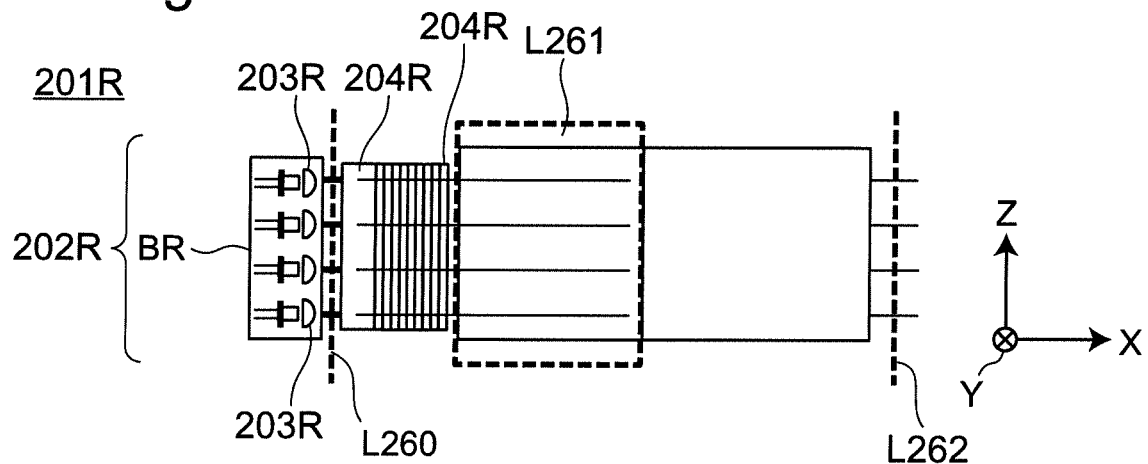
FIG. 4B is a schematic side view showing the configuration example and the optical paths of the red light source part 201R of FIG. 2.

FIG. 4A is a schematic plan view showing a configuration example and optical paths of the red light source part 201R of FIG. 2, and FIG. 4B is a schematic side view showing the configuration example and the optical paths of the red light source part 201R of FIG. 2. In addition, FIG. 4C is a front view showing a screen configured by a plurality of spot lights on a cross section L260 of FIGS. 4A and 4B, FIG. 4D is formed by a plurality of spot lights on a cross section L261 of FIGS. 4A and 4B, and FIG. 4E is a front view showing a screen configured by a plurality of spot lights on a cross section L262 of FIGS. 4A and 4B.

Referring to FIGS. 4A and 4B, the light outputted from the red light source unit 202R is shaped into substantially parallel light by the collimating lens 203R, and the light is then incident via the incident plane 204P of the plurality of optical elements 204R. In this case, each optical element 204R is an optical element having optical transparency, and is configured by an incident plane 204P perpendicular to the substantially parallel light, and an emitting plane 204Q inclined from the incident plane 204P. The inclination angle θ of the inclined emitting plane 204Q is set such that the incident light is not totally reflected in the optical element 204R. The light incident on each of the plurality of optical elements 204R is refracted by the inclined emitting plane 204Q of the optical element 204R, and only a one-axis direction of the traveling direction of the red light source unit 202R is changed, for example, on the XY-plane. The light is then emitted from the emitting plane 204Q of the optical element 204R. In the configuration example of FIG. 4A, the material of the optical element 204R is made of a borosilicate glass (BK7), which is similar to that of the optical element 204G, the inclination angle θ is 37 degrees, and the refraction angle θd of the light is about 29 degrees. In addition, an interval between the light sources in the light source part 201R is also 11 mm, which is similar to that in the case of the light source part 201G, and the adjacent optical elements 204R are shifted by about 2.0 mm.

The aspect ratio of the screen configured by the plurality of spot lights outputted from the red light source unit 202R is 2:5, which is very large as compared to the aspect ratio (1:1) of the blue light source part 201B. It is thus difficult to compress the aspect ratio to 1:1 only with the light flux emitted from the optical element 204R. The light emitted from the optical element 204R is incident again on the triangular prism 205 disposed thereafter. The light is then refracted so as to correct the traveling direction of the light beam in parallel with the substantially parallel light from the collimating lens 203R, while the light flux can be compressed to give an aspect ratio of 1:1 and emitted from the red light source part 201R. In the present configuration example, the triangular prism 205 is also made of a borosilicate glass (BK7), which is similar to that of the optical element 204R, the inclination angle θ is 37 degrees, and the refraction angle θd of the light is about 29 degrees.

Figure 4C:
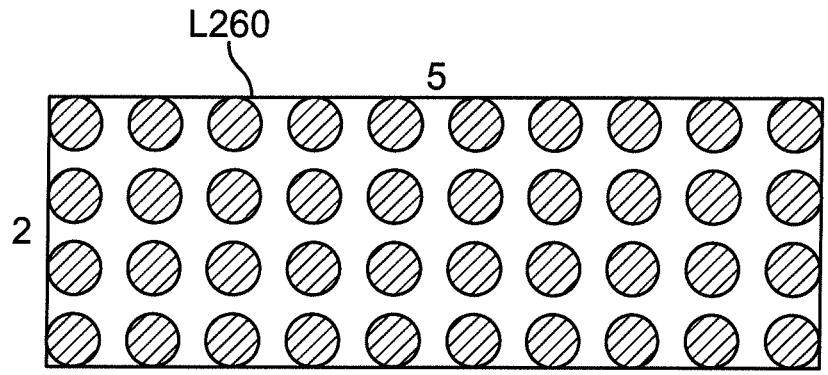
FIG. 4C is a front view showing a screen configured by a plurality of spot lights on a cross section L260 of FIGS. 4A and 4B.
Figure 4D:
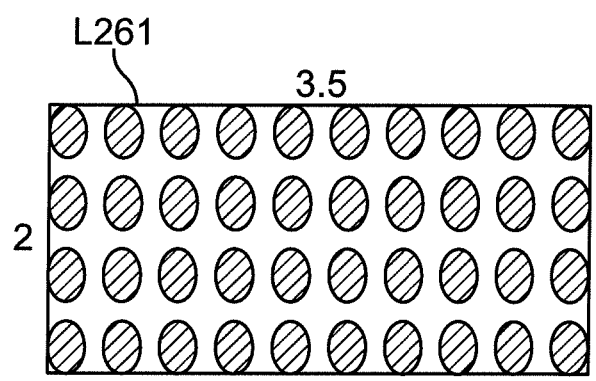
FIG. 4D is a front view showing a screen configured by a plurality of spot lights on a cross section L261 of FIGS. 4A and 4B.
Figure 4E:
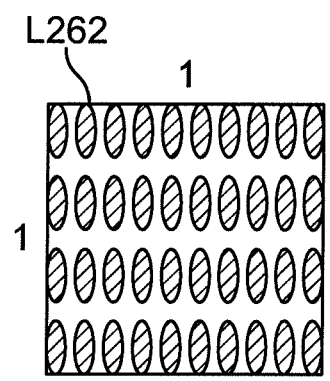
FIG. 4E is a front view showing a screen configured by a plurality of spot lights on a cross section L262 of FIGS. 4A and 4B.

As a result, as shown in FIG. 4C, the aspect ratio of the red light source unit 202R is 2:5 on the cross section L260 after emission from the collimating lens 203R. In contrast, on the cross section L261 after passing through the optical element 204R, the aspect ratio similar to that of the blue light source unit 202B is changed to about 2:3.5 as shown in FIG. 4D. Thereafter, on the cross section L262 after passing through the triangular prism 205, as shown in FIG. 4E, the aspect ratio is changed to 1:1 in a manner similar to those of the blue light source unit 202B and the green light source unit 202G.

As shown in FIG. 2, the light fluxes emitted from the light source parts 201B, 201G and 201R are synthesized by the color synthesis mirrors 210 and 211 having different transmissive and reflection characteristics for respective wavelengths. The synthesized light is then emitted from the lighting apparatus 101 in such a state that the aspect ratios of the screens of the respective colors are equal to each other. Specifically, a dichroic film that transmits a red wavelength band and reflects a green wavelength band is formed on the color synthesis mirror 210, and a dichroic film, which transmits the light of red and green wavelength bands and reflects the light of a blue wavelength band, is formed on the color synthesis mirror 211.

[1-1-2. Configuration of Projection Display Unit]

As shown in FIG. 1, the parallel light flux outputted from the lighting apparatus 101 is incident on the afocal optical system 110, and is shaped into converged parallel light. In the afocal optical system 110, the single-convex lens 111 is a condenser lens that collects parallel light from the lighting apparatus 101, and the biconcave lens 112 is a lens that collimates the light from the lens 111. The light flux emitted from the afocal optical system 110 is reflected by the reflective mirror 102 and then passes through the diffusion plate wheel 103. The diffusion plate wheel 103 has a diffusion plate affixed to a disk-shaped rotating body, and by a driving motor rotating the wheel. Then it is possible to disturb the states of the coherence and polarization characteristics of the light source of the lighting apparatus 101, while controlling the heat generation of the diffusion plate, to reduce the speckles of an image projected on the screen 400. The light emitted from the diffusion plate wheel 103 is collected by the collecting optical system 104 and is then incident on the end face of the rod integrator 105.

The light incident on the rod integrator 105 repeats total internal reflection in the rod integrator 105 and is optically output as surface light emission with a luminance distribution uniformed from the opposite end face. The rod integrator 105 is a solid rod made of a transparent component such as glass. The rod integrator 105 internally reflects incident light a plurality of times to generate light having a uniform light intensity distribution. It is noted that the rod integrator 105 may be a hollow rod with its inner wall made of a mirror surface. The light flux emitted from the lighting apparatus 101 has been changed so that the aspect ratio is 1:1. Therefore, when the light flux is collected by the collecting optical system 104, the angles of the light beams at the vertical and horizontal edges of the light flux, namely, the F-numbers, are equal to each other.

The light flux emitted from the rod integrator 105 is incident on the relay optical system 120, and passes through the single-convex lens 121, the biconvex lens 122, and the single-convex lens 123 of relay lens. Then the light flux is again shaped to have a desired paraxial magnification and angular magnification (F-number). Thereafter, the shaped light flux is incident on the TIR prism 130. The TIR prism 130 is configured by two prisms 131 and 132, and a thin air layer (not shown) is formed on the proximity surfaces of the prisms 131 and 132. The air layer totally reflects light incident at an angle which is equal to or larger than a critical angle. The light incident on the TIR prism 130 from the lens relay lens optical system 120 is totally reflected by the air layer, and a substantially image is formed on the light deflection controller 106.

The light deflection controller 106 has a DMD, and controls the DMD to modulate based on various control signals such as an image signal, to generate image light having a different light intensity in a time division manner. Specifically, the DMD has a plurality of movable micromirrors. Each micromirror basically corresponds to one pixel. The DMD switches over whether or not the reflected light is directed to the projection optical system 140 by changing angles of respective micromirrors based on a modulation signal from the light deflection controller. After the light reflected by the DMD is transmitted through both the prisms 132 and 131 of the TIR prism 130, the light (DMD-ON light) to be projected as an image is incident on the projection optical system 140, and then emitted to the screen 400. The other light (DMD-OFF light) is not incident on the projection optical system 140 so that the light is not displayed as an image.

In this case, the F-number of the light beam incident on the light deflection controller 106 has been changed to a desired F-number in both the longitudinal direction and the lateral direction by the action of changing the aspect ratio when the light beam is emitted from the lighting apparatus 101. Thus, the DMD-ON light efficiently can pass through a diaphragm in the projection optical system 140, and is projected onto the screen 400.

In addition, when a zoom function is added to the projection optical system 140 or some other case, the F-number of the projection optical system may change during a zooming operation. In this case, when the F-numbers of the respective colors are not uniform, the ratio of passage through the diaphragm in the projection optical system 140 changes, which may be perceived as a change in chromaticity on the screen 400 in some cases. However, the use of this technique makes it possible to prevent occurrence of the change in chromaticity.

The operation of each of the light source parts 201B, 201G and 201R in the lighting apparatus 101 is time-divided, and respective images projected by the light deflection controller 106 with colored lights in a red region, a green region, and a blue region having different light intensities reach the screen 400 to be perceived as a full color image. In this case, when a time division cycle is long, color flicker may be perceived by the human eye. Therefore, when a transmission rate of image information is 60 frames/second (60 fps), for example, one cycle from the red region to the yellow region is driven at triple rate (180 fps) of the image information, so that color flicker can be prevented.

[1-2. Effects Etc.]

As described above, the projection type image display apparatus 1 including the lighting apparatus 101 according to the present embodiment is provided, which includes:

(1) the light source parts 201B, 201G and 201R, in which the plurality of laser diode elements is arranged in two dimensions;

(2) the collimating lens 203 that is disposed in front of each of the light source parts 201B, 201G and 201R and converts the light flux emitted from the laser diode into substantially parallel light; and (3) one or more optical elements 204 having optical transparency, disposed in front of the collimating lens 203, and configured with an emitting plane 204Q inclined from the substantially parallel light.

Further, the projection type image display apparatus 1 is configured as follows. The substantially collimated light is incident on the plane of the optical element 204, and then refracted by the inclined emitting plane 204Q of the optical element 204. Only one-axis direction of the traveling direction of the substantially parallel light from each of the light source units 202B, 202G and 202R disposed in two dimensions is changed, and the inclined light flux of substantially parallel light is emitted in such a state that the traveling direction is diagonally changed. Then the converted light flux having an adjusted vertical-horizontal aspect ratio of each of the light source units 202B, 202G and 202R is emitted in the traveling direction of the inclined light flux. Hence, the luminous efficiency can be enhanced, and even when the F-number of the projection optical system changes, the change in chromaticity can be prevented.

In addition, the vertical-horizontal aspect ratio of the laser diode can be freely set by the inclination angle θ of each of the optical elements 204B, 204G and 204R and the arrangement method thereof. Therefore, the degree of freedom in the arrangement of the laser diodes is enhanced. Further, in thin-type designing of the lighting apparatus 101 and the projection type image display apparatus 1, it is possible to prevent the number of optical components from increasing and to prevent complication of the holding mechanism.

In the present embodiment, the optical elements 204G and 204R are configured by different triangular prisms for respective rows. However, the present disclosure is not limited to this, and the optical elements 204G and 204R may be configured to extend over a plurality of columns using, for example, a large triangular prism.

Figure 5A:
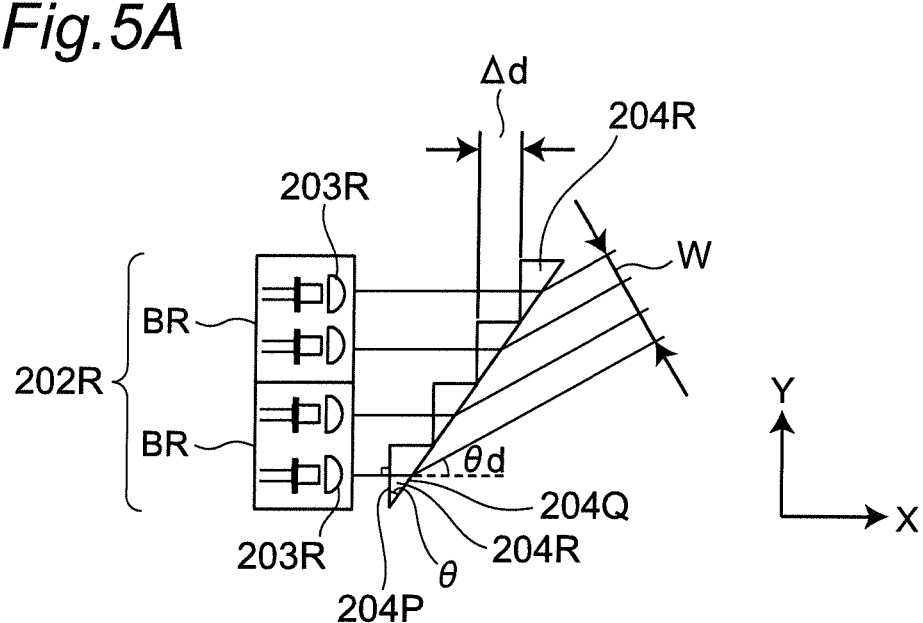
FIG. 5A is a schematic plan view showing an application example 1 of arrangement of an optical element 204R of FIG. 2.
Figure 5B:
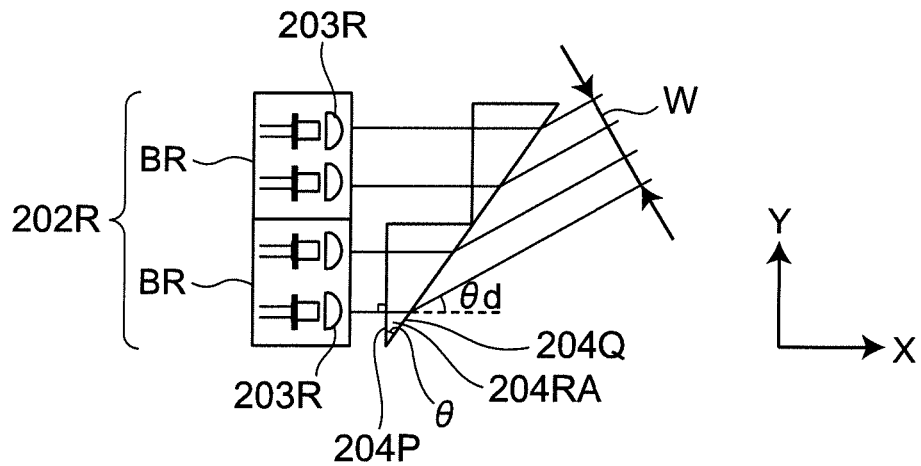
FIG. 5B is a schematic plan view showing an application example 2 of arrangement of the optical element 204R of FIG. 2.

FIG. 5A is a schematic plan view showing an application example 1 of arrangement of optical element 204R of FIG. 2, and FIG. 5B is a schematic plan view showing an application example 2 of arrangement of the optical element 204R of FIG. 2. In addition, FIG. 5C is a schematic plan view showing an application example 3 of the arrangement of the optical element 204R of FIG. 2, and FIG. 5D is a schematic plan view showing an application example 4 of arrangement of the optical element 204R of FIG. 2.

Referring to FIG. 5A, the respective inclined emitting planes 204Q of the plurality of optical elements 204R are disposed so as to be located on a straight line. In addition, in the case of such a configuration, as shown in FIG. 5B, triangular prisms may be disposed, which extend over a plurality of rows such as a plurality of optical elements 204RA. In this case, it is possible to reduce the number of parts and simplify assembly. As shown in FIG. 5A, when the emitting plane 204Q of the optical element 204R is disposed to be located on a straight line, the shift amount Δd of each pair of adjacent optical elements 204R is wider than those in FIGS. 5C and 5D described later. In addition, the light flux width W after passing through the optical element 204R becomes narrower.

Figure 5C:
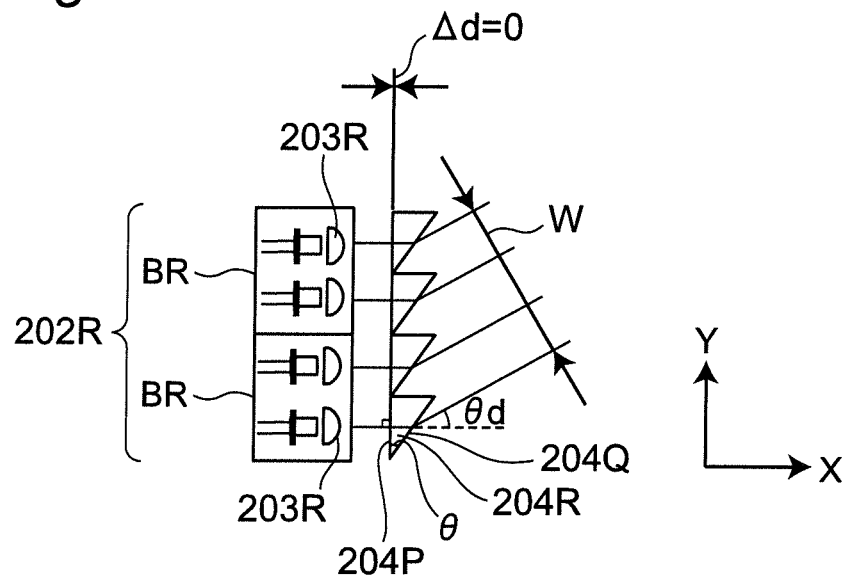
FIG. 5C is a schematic plan view showing an application example 3 of arrangement of the optical element 204R of FIG. 2.
Figure 5D:
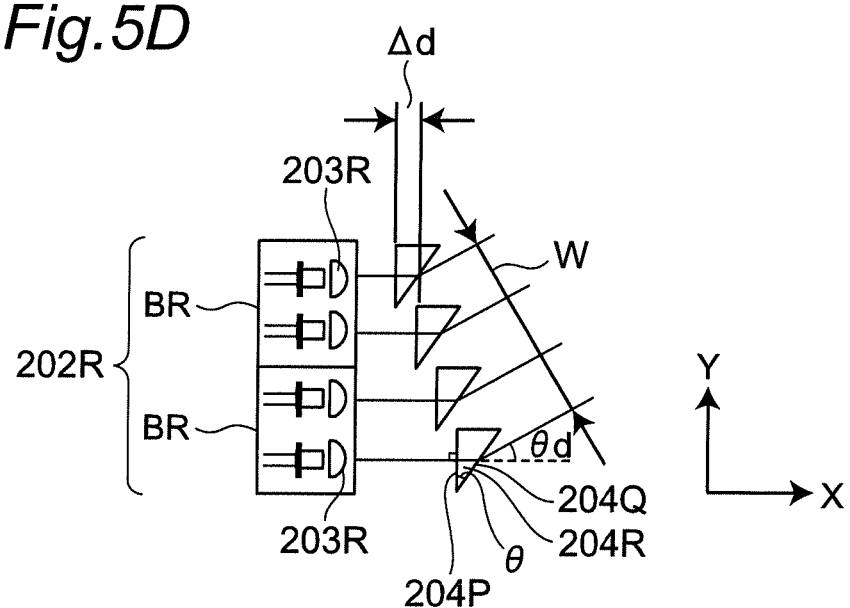
FIG. 5D is a schematic plan view showing an application example 4 of arrangement of the optical element 204R of FIG. 2.

As shown in FIG. 5C, when the shift amount Δd is set to zero, the light flux width W expands as compared to FIGS. 5A and 5B. Further, as shown in FIG. 5D, by setting the shift amount Δd to minus and making a shift in a −X-axis direction opposite to the direction in FIG. 5C, the light flux width W can be further expanded. As thus described, by changing the shift amount Δd or the inclination angle θ of each of the plurality of optical elements 204R of triangular prisms, it is possible to change the aspect ratio in a freely selected manner.

According to the present embodiment, in the lighting apparatus configured by the light source units 202B, 202G and 202R and the projection type image display apparatus using the lighting apparatus, it is possible to freely change the aspect ratio without restrictions due to the arrangement interval of the laser diodes, and without increase in the number of optical components and without complications of the holding mechanism.

In addition, according to the present embodiment, by directing the light flux with the changed aspect ratio to the reduced optical system, the light beam angle of the horizontal to vertical ratio can be freely changed at an emitting part of the reduced optical system. Thus, it is possible to provide a projection type image display apparatus and the like without chromaticity change even when the F-number of the projection optical system changes.

Further, according to the present embodiment, by selectively changing the direction of only one part of the light beams emitted from each of the light source units 202B, 202G and 202R and by guiding the light flux to a different optical system, it is possible to reduce the size of the apparatus and simplify the cooling mechanism.

As described above, the embodiment is described as examples of the technique disclosed in the present application. However, the technique in the present disclosure is not limited to this, and can be also applied to embodiments in which alternations, substitutions, additions, omissions, or the like is made as appropriate. In addition, it is also possible to combine the respective constituent elements described in the above embodiment to form a new embodiment.

Second Embodiment

In the first embodiment, the light source parts 201B, 201G and 201R are independently configured for the respective colors in the lighting apparatus 101. However, the light source units of the light source part may be used in common with different colors. A projection type image display apparatus 2 according to the embodiment configured as described above will be described below.

Figure 6:
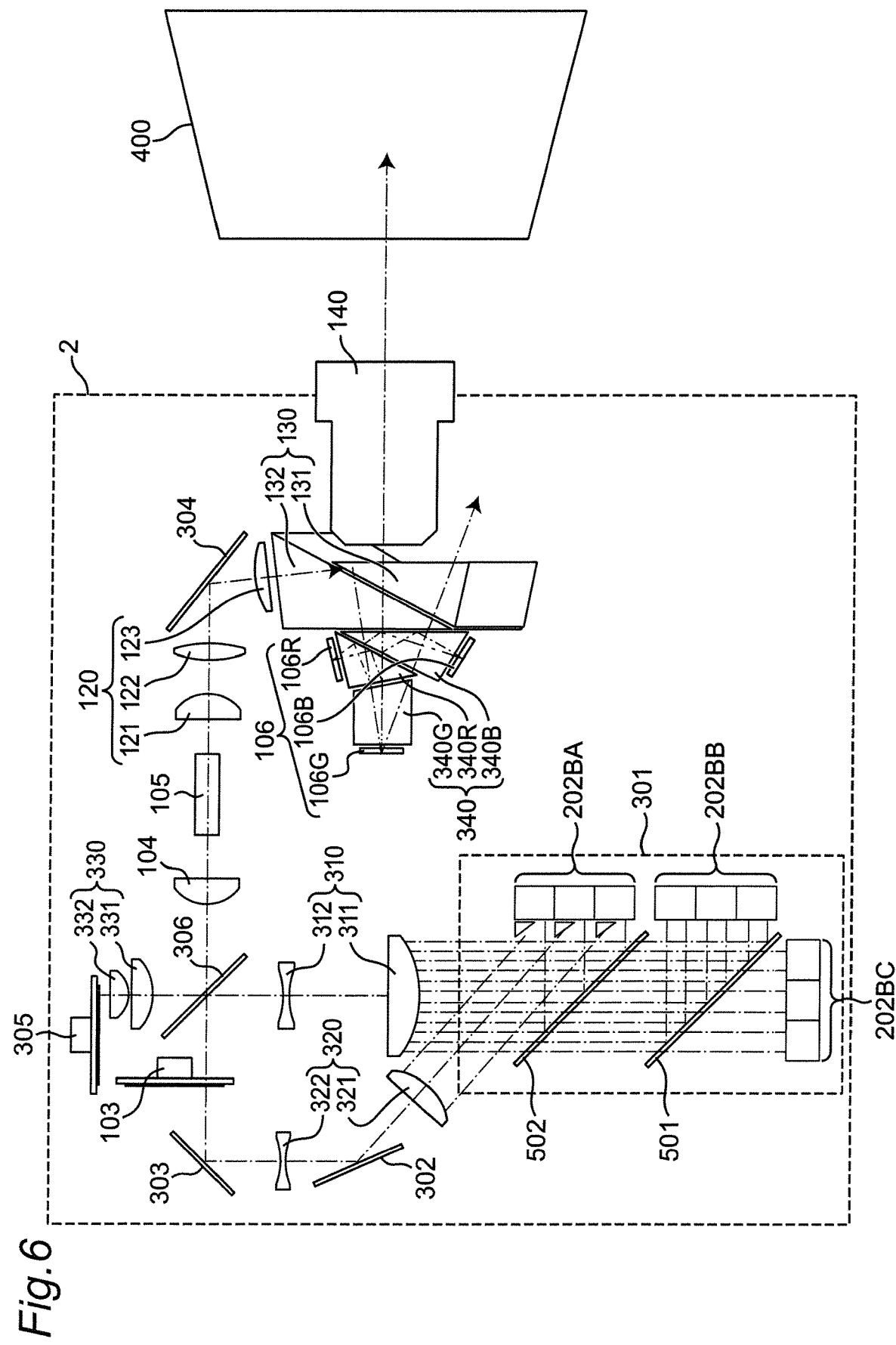
FIG. 6 is a schematic plan view showing a configuration example of a projection type image display apparatus 2 according to a second embodiment.

FIG. 6 is a schematic plan view showing a configuration example of the projection type image display apparatus 2 according to the second embodiment.

Referring to FIG. 6, the projection type image display apparatus 2 according to the second embodiment is different from the projection type image display apparatus 1 according to the first embodiment mainly in the following points.

(1) There are provided DMDs 106R, 106G and 106B, which are driven by a light deflection controller 106 and used for the three primary colors of red, green and blue, respectively.

(2) In the first embodiment, the light sources of different emission colors from the light source parts 201B, 201G and 201R are used. In contrast, in the present second embodiment, a lighting apparatus 301 includes three light source units 202BA, 202BB and 202BC of only a blue color. For a green color and a red color, yellow fluorescence emission obtained by exciting a phosphor with a blue light source is used.

[1-1. Configuration]

Referring to FIG. 6, the projection type image display apparatus 2 is configured to include the lighting apparatus 301, an afocal optical system 310 for phosphor excitation, a blue afocal optical system 320, reflective mirrors 302, 303 and 304, a diffusion plate wheel 103, a dichroic mirror 306, a phosphor collecting lens 330, a phosphor wheel 305, a collecting optical system 104, a rod integrator 105, a relay optical system 120, a TIR prism 130, a color prism 340, a light deflection controller 106, and a projection optical system 140. In this case, the afocal optical system 310 for phosphor excitation includes, for example, a single-convex lens 311 and a biconcave lens 312. For example, the blue afocal optical system 320 includes, for example, a single-convex lens 321 and a biconcave lens 322. The phosphor collecting lens 330 includes, for example, single-convex lenses 331 and 332. The relay optical system 120 includes, for example, a single-convex lens 121, a biconvex lens 122, and a single-convex lens 123.

Referring to FIG. 6, the lighting apparatus 301 outputs two blue parallel light fluxes. One light flux of blue parallel light outputted from the lighting apparatus 301 is incident on the blue afocal optical system 320 and then reflected by the reflective mirrors 302 and 303, and thereafter the light flux passes through the diffusion plate wheel 103. In this case, after the coherence of the laser light is lowered by the diffusion plate wheel 103, the laser light is transmitted through the dichroic mirror 306 and collected by the collecting optical system 104 to be incident on the rod integrator 105. The dichroic mirror 306 is configured to transmit blue region light, and reflect a yellow region light (green region light and red region light).

The other light flux of the blue parallel light outputted from the lighting apparatus 301 is incident on the afocal optical system 310 for phosphor excitation. Then, the light flux is transmitted through the dichroic mirror 306 and passes through the phosphor collecting lens 330 to form a collecting spot in the vicinity of the phosphor wheel 305. In this case, the phosphor collecting lens 330 is configured by, for example, the single-convex lenses 331 and 332 of condenser lens. In addition to efficiently collecting parallel light from the afocal optical system 310 for phosphor excitation near the phosphor wheel 305, the phosphor collecting lens 330 is configured to also correct fluorescence emission with a high numerical aperture (NA) emitted from the phosphor wheel to parallel light.

Figure 7A:
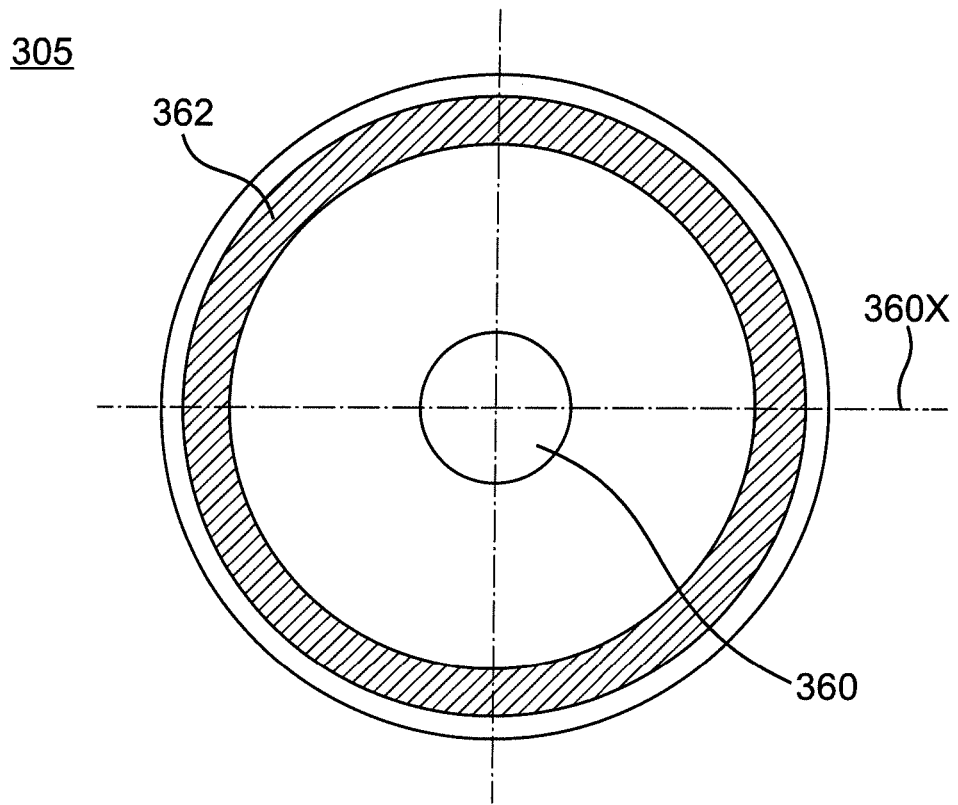
FIG. 7A is a schematic front view showing a configuration example of the phosphor wheel 305 of FIG. 6.
Figure 7B:
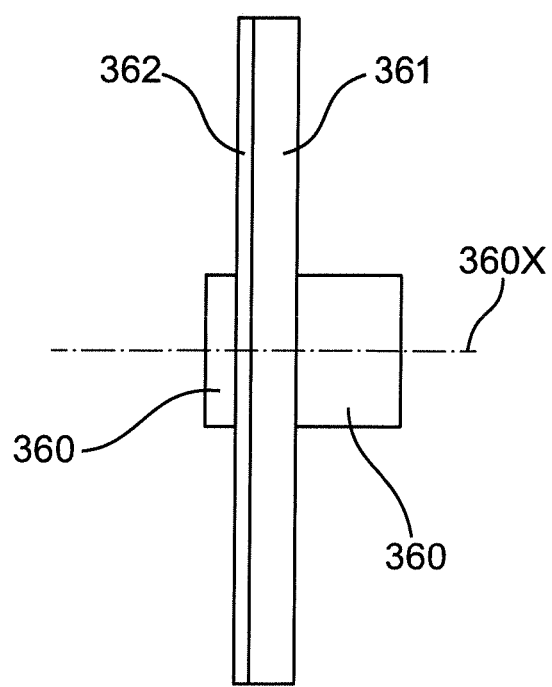
FIG. 7B is a schematic side view showing the configuration example of the phosphor wheel 305 of FIG. 6.

FIG. 7A is a schematic front view showing a configuration example of the phosphor wheel 305 of FIG. 6, and FIG. 7B is a schematic side view showing the configuration example of the phosphor wheel 305 of FIG. 6.

Referring to FIGS. 7A and 7B, the phosphor wheel 305 includes an aluminum substrate 361 and a driving motor 360 at the center thereof, and configures a circular substrate capable of controlling rotation about the central axis 360X. On the surface of the aluminum substrate 361, a reflective film (not shown) and a phosphor layer 362 are further formed on the surface thereof. The reflective film is a metal layer or a dielectric film that reflects visible light. The phosphor layer 362 is formed with a Ce-activated YAG yellow phosphor, which is excited by blue light and emits yellow light containing green and red wavelength components. A representative chemical structure of a crystal matrix of this phosphor is $Y_3Al_5O_{12}$. The phosphor layer 362 is formed in an annular shape.

The phosphor layer 362 excited by the spot lights emits yellow region light including colored lights in a green region component and a red region component. The phosphor wheel 305 is made of the aluminum substrate 361 and rotated about the central axis 360X, so that it is possible to prevent the temperature rise of the phosphor layer 362 due to blue excitation light and stably maintain the fluorescence conversion efficiency. The light incident on the phosphor layer 362 fluoresces and emits the colored lights in the green region component and the red region component, and emits the light from the phosphor wheel 305. In addition, the light emitted toward the reflective film side is reflected by the reflective film and exits from the phosphor wheel 305. The colored lights in the green region component and the red region component emitted from the phosphor layer 362 are emitted as natural light in a random polarization state, and collected on the single-convex lenses 332 and 331 of condenser lens to be converted into substantially parallel light. Then the colored light is incident on the dichroic mirror 306. The dichroic mirror 306 is configured to reflect the yellow region light, and the yellow region light is reflected and travels toward the collecting optical system 104.

The blue light that is not excited by the phosphor layer 362 is reflected by the reflective film and converted into substantially parallel light by the single-convex lenses 332 and 331 of condenser lens again, and thereafter, the blue light is incident on the dichroic mirror 306. Since the dichroic mirror 306 transmits the blue region light, the dichroic mirror 306 returns to the direction of the afocal optical system 310 for phosphor excitation, and is not transmitted toward the collecting optical system 104.

As thus described, the colored lights in the green region and the red region emitted from the phosphor layer 362 and the colored light in the blue region passed through the blue afocal optical system 320 are emitted from the dichroic mirror 306 to the collecting optical system 104 side. The respective colored lights are subjected to color synthesis, and the synthesized light is visually recognized as white light. The light transmitted through the dichroic mirror 306 is incident on the collecting optical system 104 and is collected on the rod integrator 105.

The rod integrator 105 is a solid rod made of a transparent component such as glass. The rod integrator 105 internally reflects incident light a plurality of times to generate light having a uniform light intensity distribution. It is noted that the rod integrator 105 may be a hollow rod with its inner wall configured by the mirror surface.

The relay lenses 121, 122 and 123 substantially form an image of the emitted light from the rod integrator 105 onto the DMD 106. The light emitted from the rod integrator 105 is transmitted through the relay lenses 121 and 122, and is deflected by the reflective mirror 304. Thereafter, the light passes through the relay lens 123, and is incident on the TIR prism 130. The TIR prism 130 is configured by two prisms 131 and 132, and a thin air layer (not shown) is formed on the proximity surfaces of the prisms 131 and 132. The air layer totally reflects light incident at an angle equal to or larger than a critical angle. The light incident on the TIR prism 132 from the relay lens 123 is totally reflected by this air layer, and is incident on the color prism 340.

The color prism 340 is configured by three prisms 340G, 340B and 340R, and a blue-reflecting dichroic mirror (not shown) and a red-reflecting dichroic mirror (not shown) are formed on the respective close surfaces thereof. With the respective dichroic mirrors, only light beams in the blue region are dispersed by the color prism 340B, only light beams in the red region are dispersed by the color prism 340R, and only light beams in the green region are dispersed by the color prism 340G. Then, images of the colors are substantially formed on the DMDs 106B, 106R and 106G of the light deflection controller 106 corresponding to the respective colors.

The light deflection controller 106 includes three DMDs 106B, 106R and 106G, and controls the DMDs 106B, 106R and 106G to modulate in accordance with various control signals such as image signals, to generate image lights having different light intensities. Specifically, each of the DMD 106B, 106R and 106G has a plurality of movable micromirrors. Each micromirror basically corresponds to one pixel. Each of the DMDs 106B, 106R and 106G switches over whether or not the reflected light is directed to the projection optical system 140 by changing an inclination angle of each micromirror based on the modulation signal. The light reflected by each of the DMDs 106B, 106R and 106G is transmitted through both the color prism 340 and the TIR prism 130. From among the transmitted light, the light (DMD-ON light) to be projected as an image is incident on the projection optical system 140, and then projected as an image on the screen 400 so that an image is displayed. The other light (DMD-OFF light) is not incident on the projection optical system 140 so that any image is not displayed on the screen 400.

Figure 8:
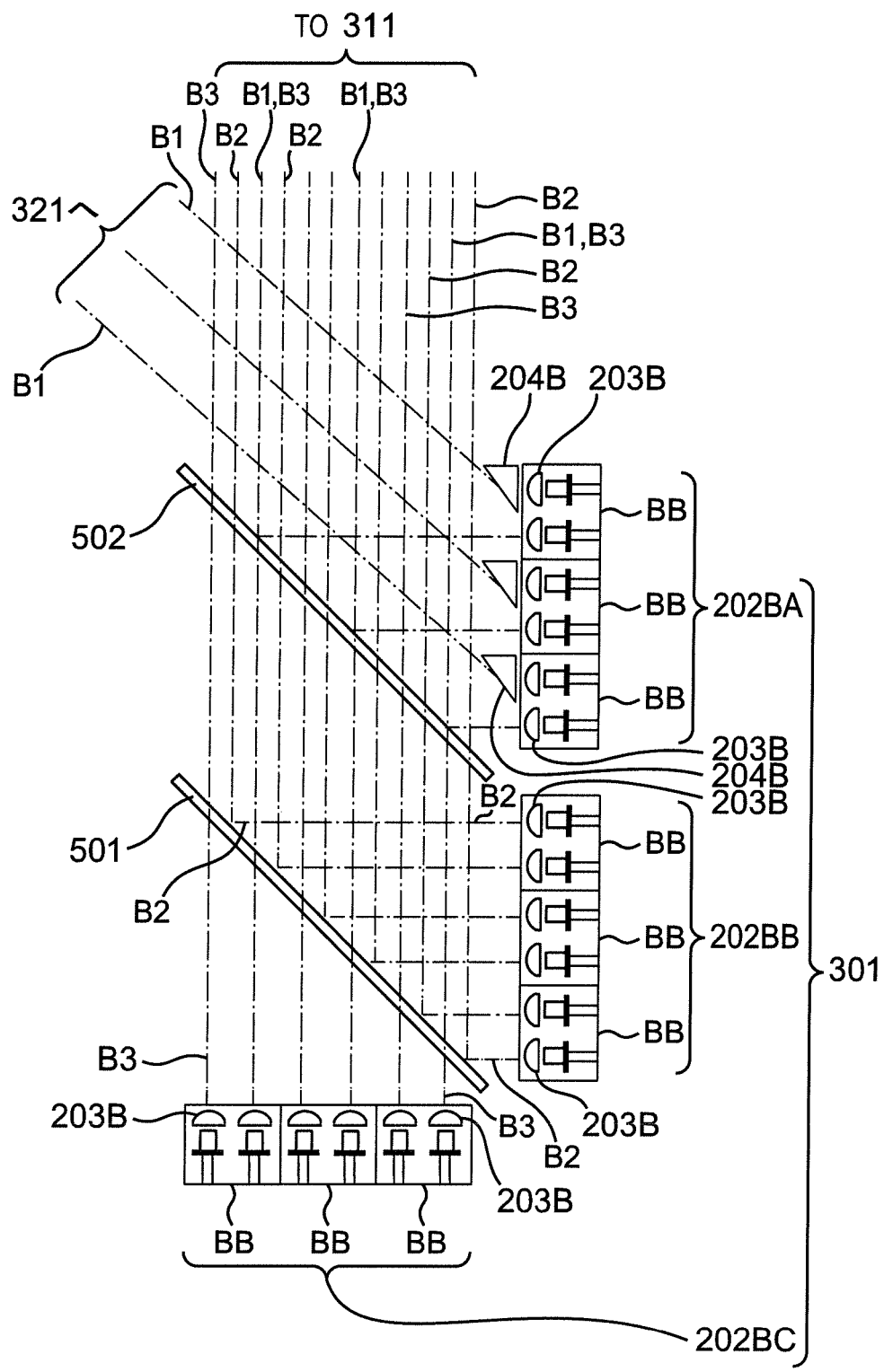
FIG. 8 is a schematic plan view showing an internal configuration example of a lighting apparatus 301 of FIG. 6.

FIG. 8 is a schematic plan view showing an internal configuration example of the lighting apparatus 301 of FIG. 6.

Referring to FIG. 8, the lighting apparatus 301 is configured to include blue dedicated light source units 202BA, 202BB and 202BC, a plurality of collimating lenses 203B, a plurality of optical elements 204B, and partial reflective mirrors 501 and 502. In this case, each of the blue dedicated light source units 202BA, 202BB and 202BC is configured to include three light source blocks BB in which blue laser diodes are put together in 4×2 arrangement in two dimensions in the vertical and horizontal directions. As a result, the total light source of each of the light source units 202BA, 202BB and 202BC is formed in 4×6 arrangement, and an aspect ratio is 2:3.

From among the spot lights B1 outputted from the blue dedicated light source unit 202BA, a spot light B1 passed through each of the plurality of optical elements 204B is incident on the single-convex lens 321. On the other hand, a spot light B1 not passed through each of the plurality of optical elements 204B is reflected by the partial reflective mirror 502, and then incident on the single-convex lens 311 of the afocal optical system 310 for phosphor excitation. In addition, a spot light B2 outputted from the blue dedicated light source unit 202BB is reflected by the partial reflective mirror 501, and then passes through the partial reflective mirror 502 to be incident on the single-convex lens 311 of the afocal optical system 310 for phosphor excitation. Further, a spot light B3 outputted from the blue dedicated light source unit 202BC passes through the partial reflective mirrors 501 and 502 and is incident on the single-convex lens 311 of the afocal optical system 310 for phosphor excitation. A configuration example for realizing the above operation will be described below.

Figure 9A:
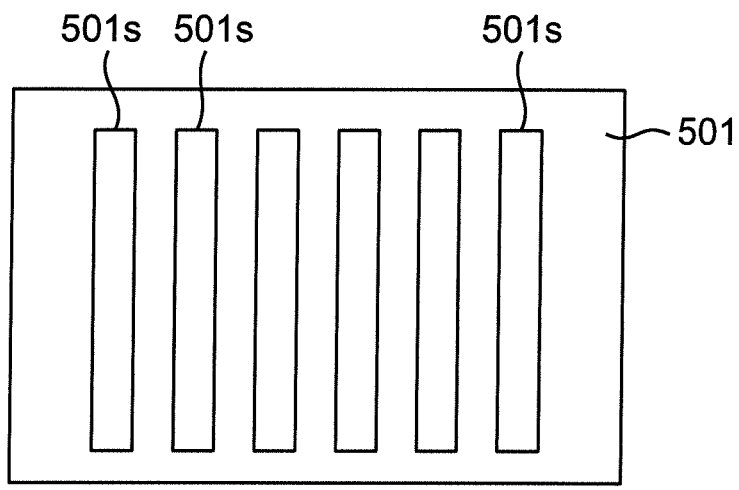
FIG. 9A is a front view showing a configuration example of a partial reflective mirror 501 of FIG. 8.
Figure 9B:
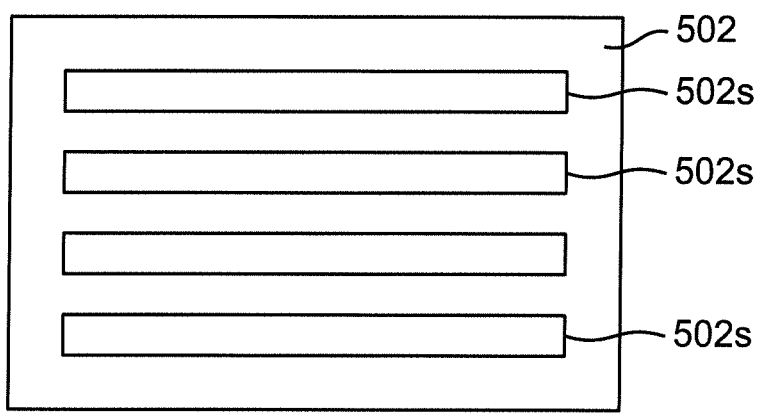
FIG. 9B is a front view showing a configuration example of a partial reflective mirror 502 of FIG. 8.

FIG. 9A is a front view showing a configuration example of the partial reflective mirror 501 of FIG. 8, and FIG. 9B is a front view showing a configuration example of the partial reflective mirror 502 of FIG. 8.

Referring to FIGS. 9A and 9B, the partial reflective mirrors 501 and 502 are configured by forming a dielectric reflective film (not shown) on the surface of the glass plate. In the partially reflective mirror 501, as shown in FIG. 9A, a plurality of rectangular slits 501s (penetrating in the thickness direction) having a vertical longitudinal direction and allowing only a predetermined spot light B3 to pass therethrough is arranged at arrangement intervals of the semiconductor devices. In addition, in the partially reflective mirror 502, as shown in FIG. 9B, a plurality of rectangular slits 501s (penetrating in the thickness direction) having a horizontal longitudinal direction and allowing only predetermined spot lights B2 and B3 to pass therethrough is arranged at arrangement intervals of the semiconductor devices.

Referring to FIG. 8, the blue dedicated light source units 202BB and 202BC are disposed such that the traveling positions of the light beams thereof are shifted laterally by a distance of half the interval between the semiconductor devices. Accordingly, the spot light B3 emitted from the light source unit 202BC passes through each of the plurality of slits 501s of the partial reflective mirror 501, and is transmitted to the partial reflective mirror 502. Meanwhile, the spot light B2 emitted from the light source unit 202BB is reflected by the dielectric reflective film of the partial reflective mirror 501, and is transmitted to the partial reflective mirror 502.

The blue dedicated light source unit 202BA is disposed such that the traveling positions of the light beams of the respective blue dedicated light source units 202BB and 202BC are shifted vertically by a distance of half the interval between the semiconductor devices. Therefore, the spot light B3 passed through the partial reflective mirror 501 passes through the plurality of slits 502s of the partial reflective mirror 502, and is transmitted to the single-convex lens 311 of the afocal optical system 310 for phosphor excitation. In addition, from among the spot light B1 outputted from the blue dedicated light source unit 202BA, after passing through the collimating lens 203B, a spot light B1 in a portion where the optical element 204B is not mounted to the front surface is transmitted without changing the traveling direction. After reaching the partial reflective mirror 502, the spot light B1 is reflected by the dielectric reflective film in the partial reflective mirror 502, and is transmitted to the single-convex lens 311 of the afocal optical system 310 for phosphor excitation. Meanwhile, a spot light B1 in the portion of the blue dedicated light source unit 202BA where the optical element 204 is mounted to the front surface is refracted in the optical element 204, does not reach the partial reflective mirror 502, and is transmitted to the single-convex lens 321 of the blue afocal optical system 320.

Figure 10A:
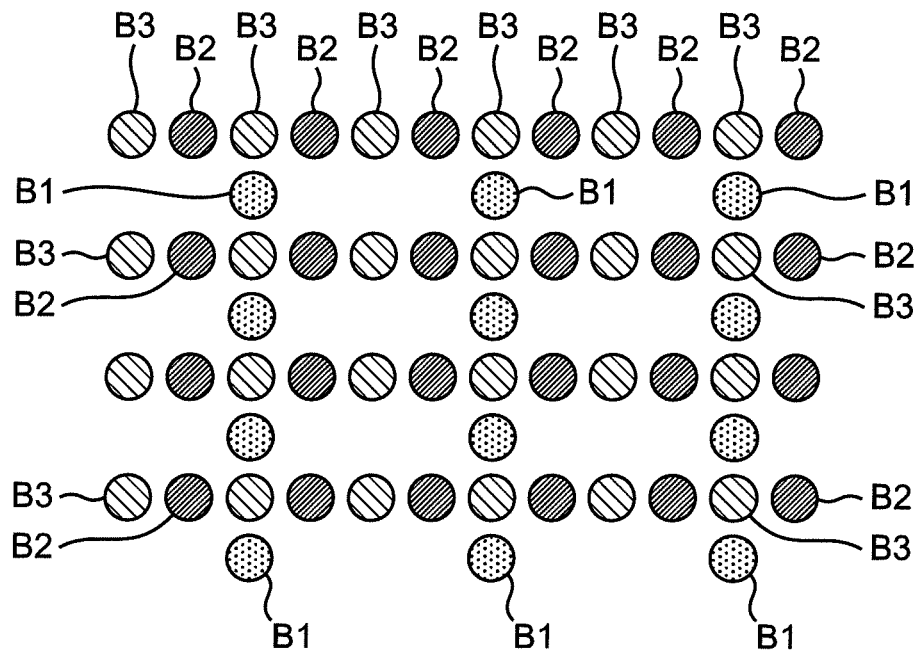
FIG. 10A is a schematic front view showing an arrangement example of spot lights B1, B2 and B3 which are emitted from the lighting apparatus 301 of FIG. 6 and transmitted to an afocal optical system 310 for phosphor excitation.
Figure 10B:
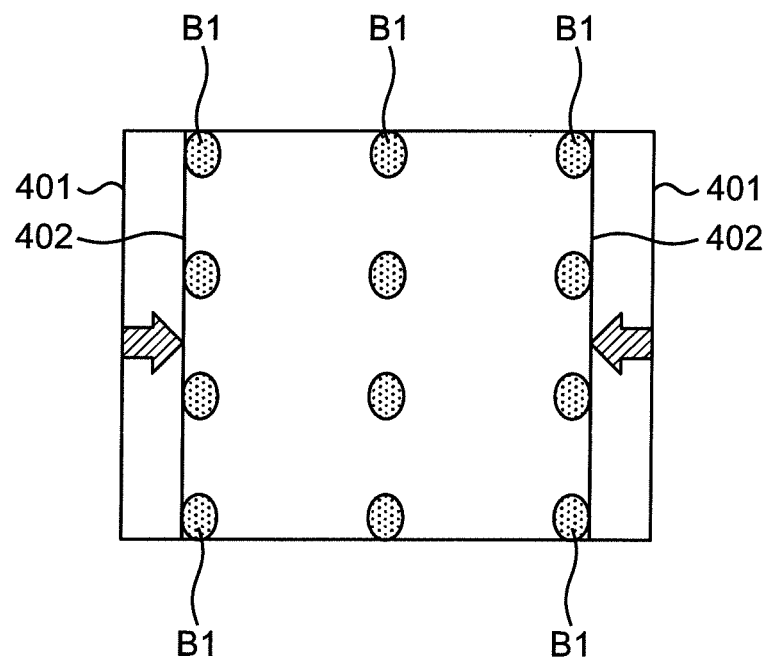
FIG. 10B is a schematic front view showing spot lights B1 emitted from the lighting apparatus 301 of FIG. 6 and transmitted to a blue afocal optical system 320.

FIG. 10A is a schematic front view showing an arrangement example of each of the spot lights B1, B2 and B3 emitted from the lighting apparatus 301 of FIG. 6 and transmitted to the afocal optical system 310 for phosphor excitation. FIG. 10B is a schematic front view showing the spot light B1 emitted from the lighting apparatus 301 and transmitted to the blue afocal optical system 320 of FIG. 6.

As shown in FIG. 10A, the spot lights B1, B2 and B3 passed through or having been reflected by the partial reflective mirrors 501 and 502 are aligned at an interval which is half the interval between the semiconductor devices. The aspect ratio of this light source arrangement is 2:3, which is similar to the aspect ratio of the blue dedicated light source units 202BA, 202BB and 202BC of FIG. 8. The light flux is incident on the afocal optical system 310 for phosphor excitation. Thereafter, the light flux is transmitted through the dichroic mirror 306, passes through the phosphor collecting lens 330, and forms spot lights collected near the phosphor wheel 305. The phosphor layer 362 is excited by the collected spot lights, and emits yellow region light including colored lights in the green region component and the red region component. The phosphor spot light is a very small spot light having a diameter of about 2 mm and the spot light spreads also at the time of light emission from the phosphor. Therefore, even when the aspect ratio of light beams incident on the afocal optical system 310 for phosphor excitation is 2:3, the aspect ratio of the screen configured by the spot light reflected by the phosphor layer 362 is corrected to be approximately 1:1, leading to no significant influence on the efficiency.

Meanwhile, FIG. 10B shows the arrangement of the spot lights B1 that pass through three optical elements 204 and do not reach the partial reflective mirror 502 but is transmitted to the blue afocal optical system 320. The three optical elements 204 are mounted to the light sources on one side of the three light source blocks BB of the blue dedicated light source unit 202BA, so that the aspect ratio of the screen due to the spot light B1 traveling from the blue dedicated light source unit 202BA to the three optical elements 204 is 2:3. However, as shown in the first embodiment, when the spot lights are refracted by the plurality of optical elements 204 as described in the first embodiment, the screen is laterally compressed and transformed from the screen 401 to the screen 402. Then, the output light whose aspect ratio is changed to 1:1 is incident on the blue afocal optical system 320.

The light flux incident on the blue afocal optical system 320 passes through the diffusion plate wheel 103 after being reflected by the middle reflective mirrors 302 and 303. After the passing light is reduced in coherence of the laser light by the diffusion plate wheel 103, the light is transmitted through the dichroic mirror 306 and collected by the collecting optical system 104 to be incident on the rod integrator 105. Since the blue region light is directly incident on the rod integrator 105 as thus described, by setting the aspect ratio to 1:1, the aspect ratio of reflected light from the phosphor layer 362 can be made equal to 1:1. This leads to preventing the efficiency degradation in the projection optical system 140. In addition, since all of the blue region light, the green region light, and the red region light are aligned, even when the F-number of the projection lens changes, a favorable image can be projected without losing a white balance.

[1-2. Effects Etc.]

As described above, in the lighting apparatus 301 and the projection type image display apparatus 2 according to the present embodiment, by using the plurality of optical elements 204, the light fluxes outputted from the blue dedicated light source units 202BA, 202BB and 202BC are separated, and the aspect ratio is changed. Thus, it is possible to simplify the optical system, and downsize the projection type image display apparatus 2. Additionally, since the blue dedicated light source units 202BA, 202BB and 202BC can be formed as an integral structure, it is possible to reduce the cost by streamlining the cooling mechanism of the light source units 202BA, 202BB and 202BC.

As described above, each of the embodiments is described as illustration of the technique in the present disclosure. To that end, the accompanying drawings and detailed description is provided. Accordingly, some of the constituent elements described in the accompanying drawings and the detailed description can include not only constituent elements essential for solving the problem, but also constituent elements not being essential for solving the problem but provided for illustrating the above technique. For this reason, even when these nonessential constituent elements are described in the accompanying drawings and detailed description, these nonessential constituent elements should not be recognized as essential.

In addition, since the above embodiments are provided for illustrating the technique in the present disclosure, it is possible to make various changes, substitutions, additions, omissions, or the like within the scope of claims or the equivalent thereof.

What is claimed is:

1. A lighting apparatus comprising:
    a light source unit including a plurality of laser diode elements arranged in two dimensions;
    a collimating lens disposed in front of the light source unit, the collimating lens converting a light flux emitted from each of the laser diodes into substantially parallel light; and
    at least one optical element disposed in front of the collimating lens, the optical element changing only a predetermined one-axis direction of a traveling direction of the substantially parallel light,
    wherein the optical element has optical transparency, and has a first surface perpendicular to the substantially parallel light and a second surface inclined from the first surface, and
    wherein, when the substantially parallel light is incident on the first surface of the optical element, the optical element reflects the substantially parallel light by the second surface to change only the one-axis direction of the traveling direction of the substantially parallel light, and emits an inclined light flux inclined from the substantially parallel light, and
    wherein an aspect ratio of a screen configured by a plurality of spot lights from the light source unit is changed to a predetermined aspect ratio on a cross section of a predetermined position in a traveling direction of the inclined light flux.

2. The lighting apparatus as claimed in claim 1, wherein the at least one optical element is configured by a first triangular prism.

3. The lighting apparatus as claimed in claim 1,
    wherein the at least one optical element is configured by a plurality of first triangular prisms, and
    wherein each of the first triangular prisms is shifted for at least one laser diode element of the light source unit, from the traveling direction of the substantially parallel light from the collimating lens.

4. The lighting apparatus as claimed in claim 1, further comprising a reduced optical system that collects the converted light flux and changes light beam angles in vertical and horizontal directions of the collected light flux.

5. The lighting apparatus as claimed in claim 1, further comprising a second triangular prism provided at a predetermined position in a traveling direction of the inclined light flux, and further changing the traveling direction of the inclined light flux.

6. The lighting apparatus as claimed in claim 1,
    wherein the plurality of optical elements is arranged so as to face only a part of the plurality of laser diode elements of the light source unit, and
    wherein the lighting apparatus emits an inclined light flux passing through the plurality of optical elements, and an inclined light flux not passing through the plurality of optical elements.

7. A projection type image display apparatus comprising:
    a lighting apparatus;
    a light modulation apparatus modulating light emitted from the lighting apparatus in accordance with image information to form image light; and
    a projection optical system projecting the image light,
    wherein the lighting apparatus comprises:
    a light source unit including a plurality of laser diode elements arranged in two dimensions;
    a collimating lens disposed in front of the light source unit, the collimating lens converting a light flux emitted from each of the laser diodes into substantially parallel light; and
    at least one optical element disposed in front of the collimating lens, the optical element changing only a predetermined one-axis direction of a traveling direction of the substantially parallel light,
    wherein the optical element has optical transparency, and has a first surface perpendicular to the substantially parallel light and a second surface inclined from the first surface, and
    wherein, when the substantially parallel light is incident on the first surface of the optical element, the optical element reflects the substantially parallel light by the second surface to change only the one-axis direction of the traveling direction of the substantially parallel light, and emits an inclined light flux inclined from the substantially parallel light, and
    wherein an aspect ratio of a screen configured by a plurality of spot lights from the light source unit is changed to a predetermined aspect ratio on a cross section of a predetermined position in a traveling direction of the inclined light flux.

\* \* \* \* \*